US012800922B2

(12) United States Patent
Kardasz et al.

(10) Patent No.: US 12,800,922 B2
(45) Date of Patent: Nov. 17, 2026

(54) LIGHT PROJECTOR MODULE WITH DIRECTLY BONDED AND ORTHOGONAL RIGID COMPONENTS

(71) Applicant: Apple Inc., Cupertino, CA (US)

(72) Inventors: Martin R Kardasz, Mountain View, CA (US); Alexander D Schlaupitz, Longmont, CO (US); Flynn P Carson, Redwood City, CA (US); Han Ming Chu, Hsinchu (TW); Ian D St. Louis, San Diego, CA (US); Jacqueline L Nguyen, Denver, CO (US); Johan L Piper, Cupertino, CA (US); Jonas Hsu, Cupertino, CA (US); Kumar Nagarajan, Cupertino, CA (US); Pierpaolo Lupo, Cupertino, CA (US); Steven M Scardato, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 19/032,991

(22) Filed: Jan. 21, 2025

(65) Prior Publication Data

US 2025/0328010 A1 Oct. 23, 2025

Related U.S. Application Data

(60) Provisional application No. 63/637,817, filed on Apr. 23, 2024.

(51) Int. Cl.
*G02B 27/01* (2006.01)

(52) U.S. Cl.
CPC ................................ *G02B 27/0101* (2013.01)

(58) Field of Classification Search
CPC .................................................. G02B 27/0101
See application file for complete search history.

(56) References Cited

U.S. PATENT DOCUMENTS

| | | | | |
|---|---|---|---|---|
| 6,619,800 | B1 | 9/2003 | Takezawa et al. | |
| 11,316,322 | B2 | 4/2022 | Galvano et al. | |
| 11,762,200 | B2 | 9/2023 | Katkar et al. | |
| 2005/0007556 | A1 * | 1/2005 | Yanagisawa ......... | H04N 9/3141 348/E5.143 |
| 2020/0117075 | A1 | 4/2020 | Koshihara | |
| 2022/0155490 | A1 | 5/2022 | Haba et al. | |
| 2023/0317703 | A1 | 10/2023 | Tao et al. | |

FOREIGN PATENT DOCUMENTS

| | | | |
|---|---|---|---|
| CN | 110850669 | A | 2/2020 |
| CN | 115016213 | A | 9/2022 |
| JP | 2002107820 | A | 4/2002 |

* cited by examiner

*Primary Examiner* — James A Dudek
(74) *Attorney, Agent, or Firm* — Treyz Law Group, P.C.; Joseph F. Guihan; Jinie M. Guihan

(57) ABSTRACT

An electronic device may include a light projector module that generates image light and an optical system that redirects the image light towards an eye box. The light projector module may include multiple display modules and an optical combiner that combines the light from the multiple display modules. The light projector may include multiple system-in-packages. Adjacent display modules and/or system-in-packages may be directly bonded such that the components are orthogonal. Using these direct bonds may conserve space within the light projector module and improve alignment within the light projector module.

22 Claims, 13 Drawing Sheets

LIGHT PROJECTOR MODULE WITH DIRECTLY BONDED AND ORTHOGONAL RIGID COMPONENTS

This application claims the benefit of U.S. provisional patent application No. 63/637,817, filed Apr. 23, 2024, which is hereby incorporated by reference herein in its entirety.

BACKGROUND

This relates generally to optical systems and, more particularly, to optical systems for displays.

Electronic devices may include displays that present images to a user's eyes. For example, devices such as virtual reality and augmented reality headsets may include displays with optical elements that allow users to view the displays.

It can be challenging to design devices such as these. If care is not taken, the components used in displaying content may be unsightly and bulky and may not exhibit desired levels of optical performance.

SUMMARY

A display system may include a waveguide and a light projector module that emits light into the waveguide. The light projector module may include an optical combiner having first and second sides, a first rigid component on the first side of the optical combiner, and a second rigid component on the second side of the optical combiner. The first and second rigid components may be orthogonal and the first rigid component may be directly bonded to the second rigid component.

A display system may include a waveguide and a light projector module that emits light into the waveguide. The light projector module may include a display module, a first system-in-package having a first substrate, and a second system-in-package having a second substrate. The first and second substrates may be orthogonal and a direct bond may mechanically and electrically connect the first and second substrates.

A display system may include a waveguide and a light projector module that emits light into the waveguide. The light projector module may include an optical combiner having first and second opposing sides, third and fourth opposing sides, and fifth and sixth opposing sides, a first display module formed on the first side of the optical combiner, a second display module formed on the second side of the optical combiner, a third display module formed on the third side of the optical combiner, a first system-in-package formed on the fifth side of the optical combiner, a second system-in-package formed on the sixth side of the optical combiner, and a third system-in-package formed on the third side of the optical combiner. Light from the first, second and third display modules may be configured to exit the fourth side of the optical combiner, the third display module may be interposed between the third side of the optical combiner and the third system-in-package, and at least two components of the first display module, the second display module, the third display module, the first system-in-package, the second system-in-package, and the third system-in-package may be directly bonded and orthogonal to one another.

DETAILED DESCRIPTION

Figure 1:
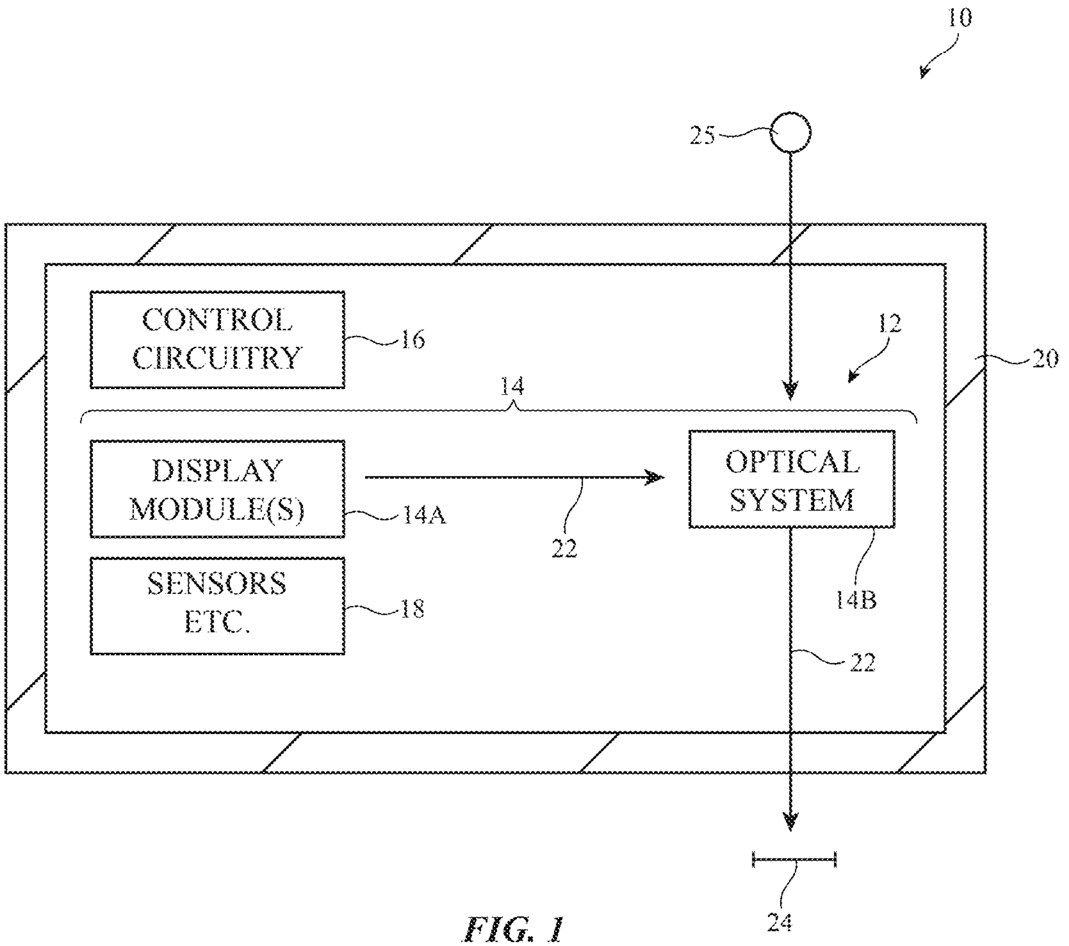
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 (sometimes referred to as display systems 14 or near-eye display systems 14) mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (image light) that is redirected towards a user's eyes at eye box 24 using an associated one of optical systems 14B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Display modules 14A may include reflective displays (e.g., liquid crystal on silicon (LCOS) displays, digital-micromirror device (DMD) displays, or other spatial light modulators), emissive displays (e.g., micro-light-emitting diode (uLED) displays, organic light-emitting diode (OLED) displays, laser-based displays, etc.), or displays of other types. Light sources in display modules 14A may include uLEDs, OLEDs, LEDs, lasers, combinations of these, or any other desired light-emitting components.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2A:
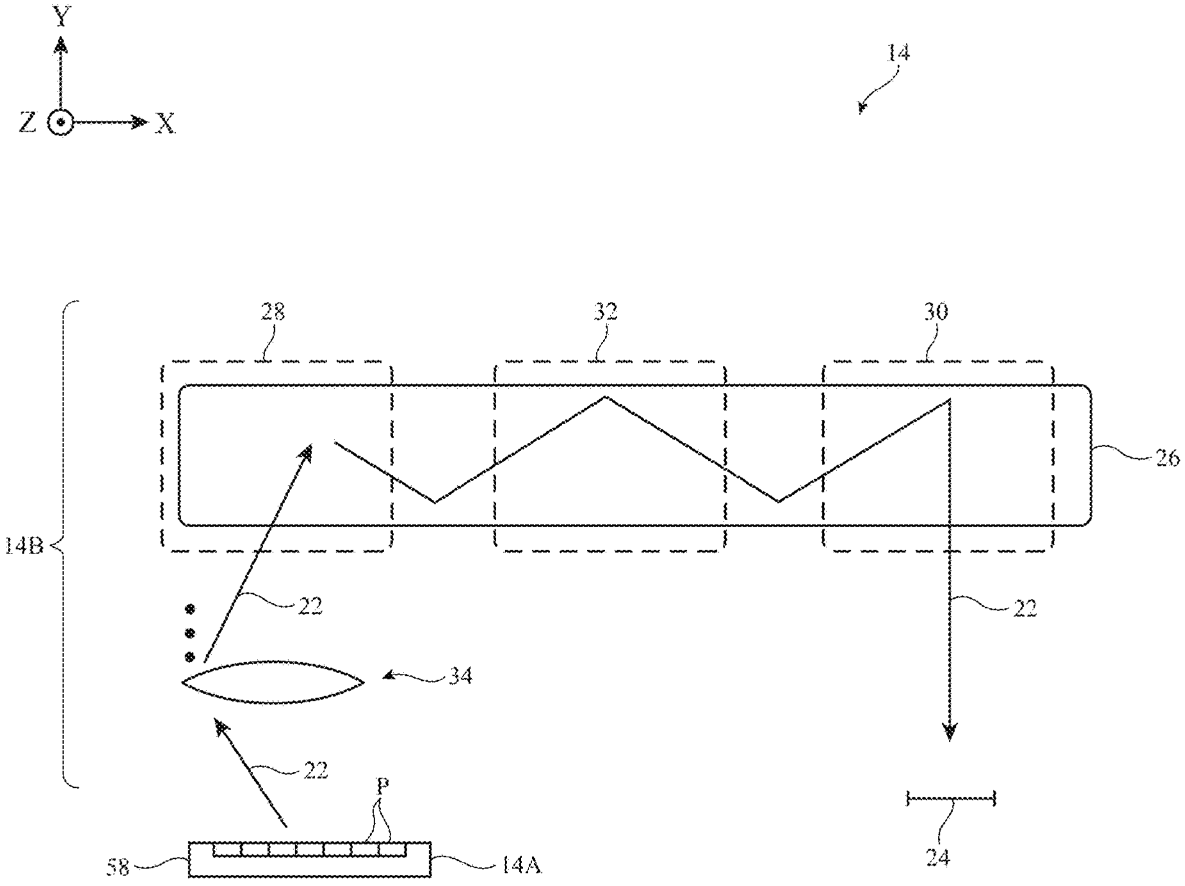
FIG. 2A is a top view of an illustrative display system with a single display module, a waveguide, and collimating optics in accordance with some embodiments.

FIG. 2A is a top view of an illustrative display 14 that may be used in system 10 of FIG. 1. As shown in FIG. 2A, near-eye display 14 may include one or more display modules such as display module 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

If desired, waveguide 26 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Optical system 14B may include collimating optics such as collimating optics 34 (sometimes referred to as collimating lens 34). Collimating lens 34 may include one or more lens elements and/or mirrors that help direct image light 22 towards waveguide 26. If desired, display module 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2A, display module 14A may generate light 22 associated with image content to be displayed to eye box 24. Light 22 may be collimated using collimating optics 34. Optical system 14B may be used to present light 22 output from display module 14A to eye box 24.

Display module 14A may include one or more light-emitting pixels P on a rigid substrate 58. The rigid substrate may be formed from silicon, glass, a dielectric material, or another desired material. Each display module described herein may include one or more light-emitting pixels on a rigid substrate similar to as shown in FIG. 2A.

Optical system 14B may include one or more optical couplers such as input coupler 28, cross-coupler 32, and output coupler 30. In the example of FIG. 2A, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc.

The example of FIG. 2A is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide light 22 down its length via total internal reflection. Input coupler 28 may be configured to couple light 22 from display module 14A (lens 34) into waveguide 26, whereas output coupler 30 may be configured to couple light 22 from within waveguide 26 to the exterior of waveguide 26 and towards eye box 24. For example, display module 14A may emit light 22 in direction +Y towards optical system 14B. When light 22 strikes input coupler 28, input coupler 28 may redirect light 22 so that the light propagates within waveguide 26 via total internal reflection towards output coupler 30 (e.g., in the positive X-direction). When light 22 strikes output coupler 30, output coupler 30 may redirect light 22 out of waveguide 26 towards eye box 24 (e.g., in the negative Y-direction). In scenarios where cross-coupler 32 is formed at waveguide 26, cross-coupler 32 may redirect light 22 in one or more directions as it propagates down the length of waveguide 26, for example.

Input coupler 28, cross-coupler 32, and/or output coupler 30 may be based on reflective and refractive optics or may be based on holographic (e.g., diffractive) optics. In arrangements where couplers 28, 30, and 32 are formed from reflective and refractive optics, couplers 28, 30, and 32 may include one or more reflectors (e.g., an array of micromirrors, partial mirrors, or other reflectors). In arrangements where couplers 28, 30, and 32 are based on holographic optics, couplers 28, 30, and 32 may include diffractive gratings (e.g., volume holograms, surface relief gratings, etc.).

Figure 2B:
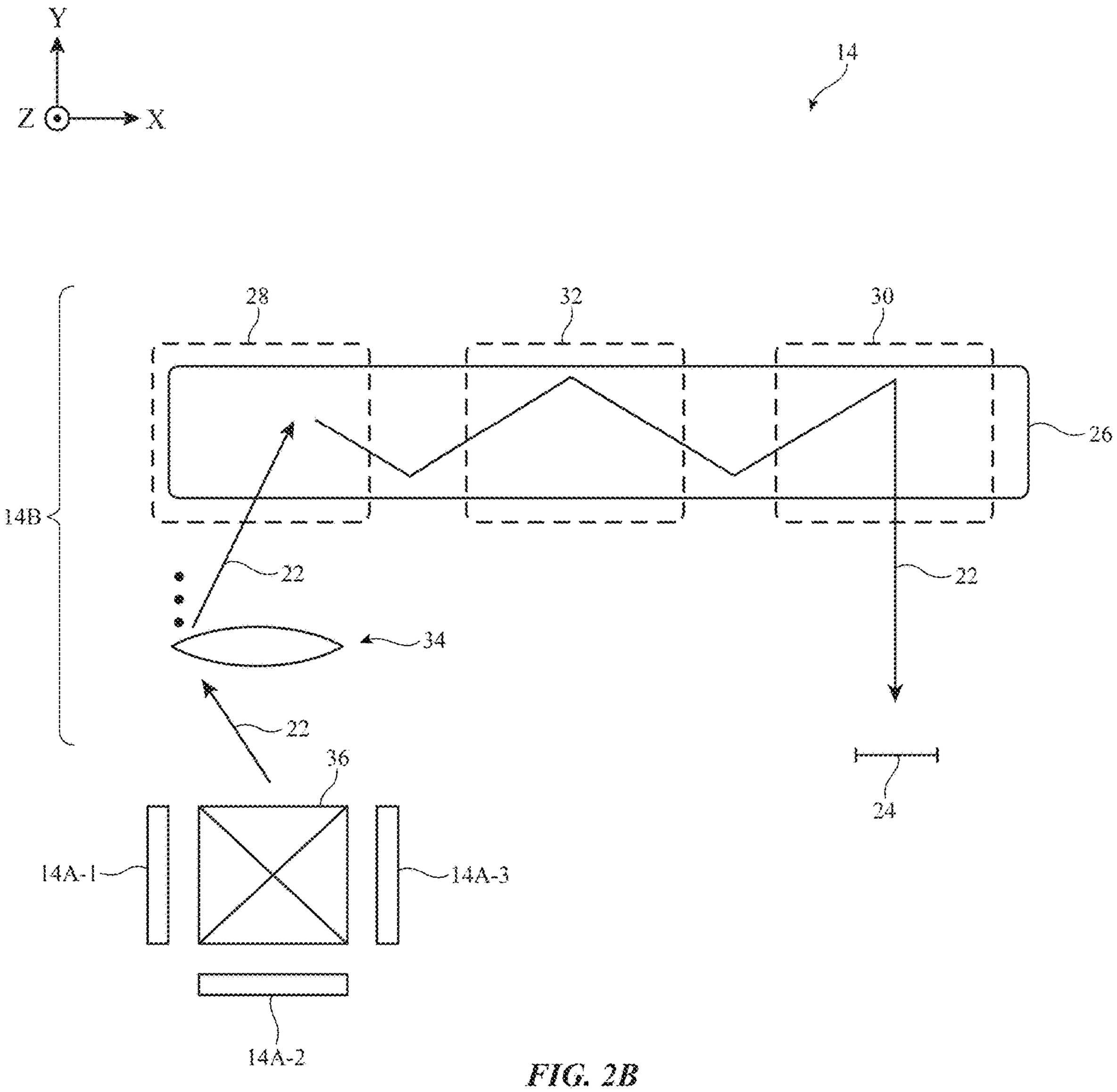
FIG. 2B is a top view of an illustrative display system with multiple display modules, an optical combiner for the multiple display modules, a waveguide, and collimating optics in accordance with some embodiments.

In the example of FIG. 2A, a single display module 14A emits image light 22 into waveguide 26 via collimating optics 34 and input coupler 28. The example of including only a single display module is merely illustrative. In another possible arrangement, shown in FIG. 2B, multiple display modules may be included. As shown in FIG. 2B, display 14 may include display modules 14A-1, 14A-2, and 14A-3 that are all associated with a single optical system 14B. As an example, the display modules may emit different colors of light (e.g., display module 14A-1 may emit red light, display module 14A-2 may emit blue light, and display module 14A-3 may emit green light).

When multiple display modules are included for a single optical system 14B, display 14 may include an optical combiner 36 (sometimes referred to as prism 36, X-cube 36, etc.). Optical combiner 36 may combine the light emitted by display modules 14A-1, 14A-2, and 14A-3 into image light 22 (e.g., image light 22 may include red, green, and blue light). The optical combiner may include angled surfaces that selectively reflect light based on color.

Figure 3B:
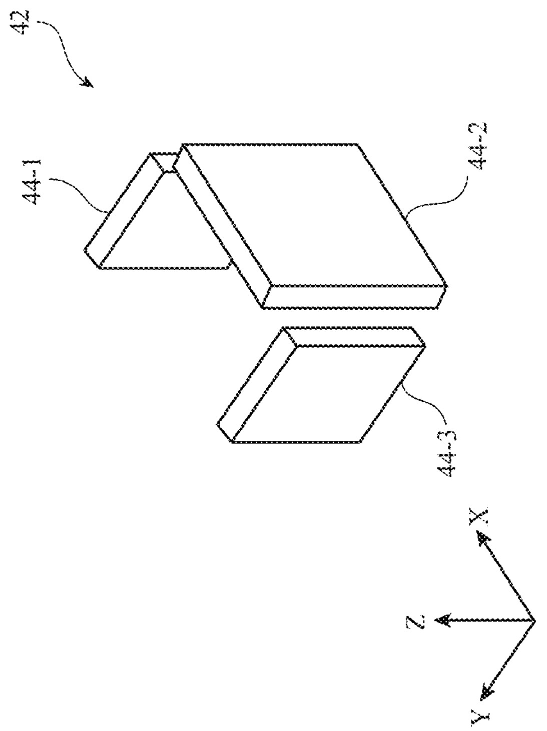
FIG. 3B is a perspective view of an illustrative light projector module with multiple system-in-packages in accordance with some embodiments.
Figure 3A:
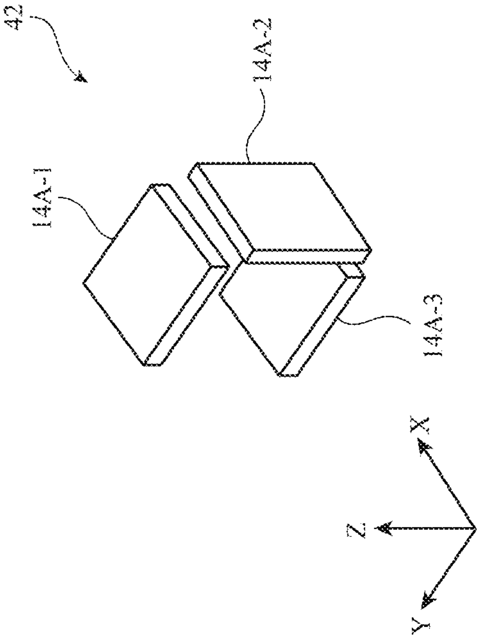
FIG. 3A is a perspective view of an illustrative light projector module with multiple display modules in accordance with some embodiments.

The optical combiner and display modules of FIG. 2B may collectively be referred to as a light projector module. FIGS. 3A and 3B show additional details regarding the arrangement of the light projector module. As shown in FIG. 3A, light projector module 42 may include display modules 14A-1, 14A-2, and 14A-3. Display module 14A-1 may be parallel to the XY-plane on a first side of the optical combiner (which is not explicitly shown in FIG. 3A for simplicity of the drawing) whereas display module 14A-3 may be parallel to the XY-plane on a second, opposing side of the optical combiner. In other words, display modules 14A-1 and 14A-3 are parallel and are formed on first and second opposing sides of the optical combiner. Display module 14A-2, meanwhile, is parallel to the XZ-plane and is interposed between display modules 14A-1 and 14A-3.

In addition to display modules 14A-1, 14A-2, and 14A-3, light projector module 42 (sometimes referred to as projector 42, light projector 42, projector system 42, light projector system 42, projector assembly 42, light projector assembly 42, etc.) may include one or more system-in-packages. Each system-in-package (SiP) may include a number of integrated circuits (ICs) and/or other electronic components (e.g., resistors, capacitors, inductors, etc.) enclosed in one chip carrier package. Each SiP may include a substrate upon which the one or more integrated circuits are mounted. The integrated circuits may be stacked on the substrate, placed side by side on the substrate, and/or embedded in the substrate. A mold material may be formed over the integrated circuits on the substrate to enclose the integrated circuits in a unitary package.

FIG. 3B shows the system-in-packages that are included in projector 42. As shown, projector 42 includes a first SiP 44-1, a second SiP 44-2, and a third SiP 44-3. SiP 44-1 may be parallel to the YZ-plane on a first side of the optical combiner (which is not explicitly shown in FIG. 3B for simplicity of the drawing) whereas SiP 44-3 may be parallel to the YZ-plane on a second, opposing side of the optical combiner. In other words, system-in-packages 44-1 and 44-3 are parallel and are formed on first and second opposing sides of the optical combiner. SiP 44-2, meanwhile, is parallel to the XZ-plane and is interposed between system-in-packages 44-1 and 44-3.

It should be understood that the display modules of FIG. 3A and the system-in-packages of FIG. 3B may be included in a single projector. The optical combiner may be a cube with 6 sides. Display module 14A-2 may be interposed between the first side of the optical combiner and SiP 44-2. Display module 14A-2 and SiP 44-2 may be parallel to the XZ-plane. Display modules 14A-1 and 14A-3 may be adjacent to second and third sides of the optical combiner (parallel to the XY-plane), system-in-packages 44-1 and 44-3 may be adjacent to fourth and fifth sides of the optical combiner (parallel to the YZ-plane), and the light from the projector may exit the sixth side of the optical combiner.

Each one of display modules 14A-1, 14A-2, and 14A-3 may include one or more light-emitting pixels on a rigid substrate, similar to as shown in FIG. 2A. Each one of system-in-packages 44-1, 44-2, and 44-3 may include one or more integrated circuits on a rigid substrate. Therefore, each one of components 14A-1, 14A-2, 14A-3, 44-1, 44-2, and 44-3 may be referred to as rigid components.

Figure 4:
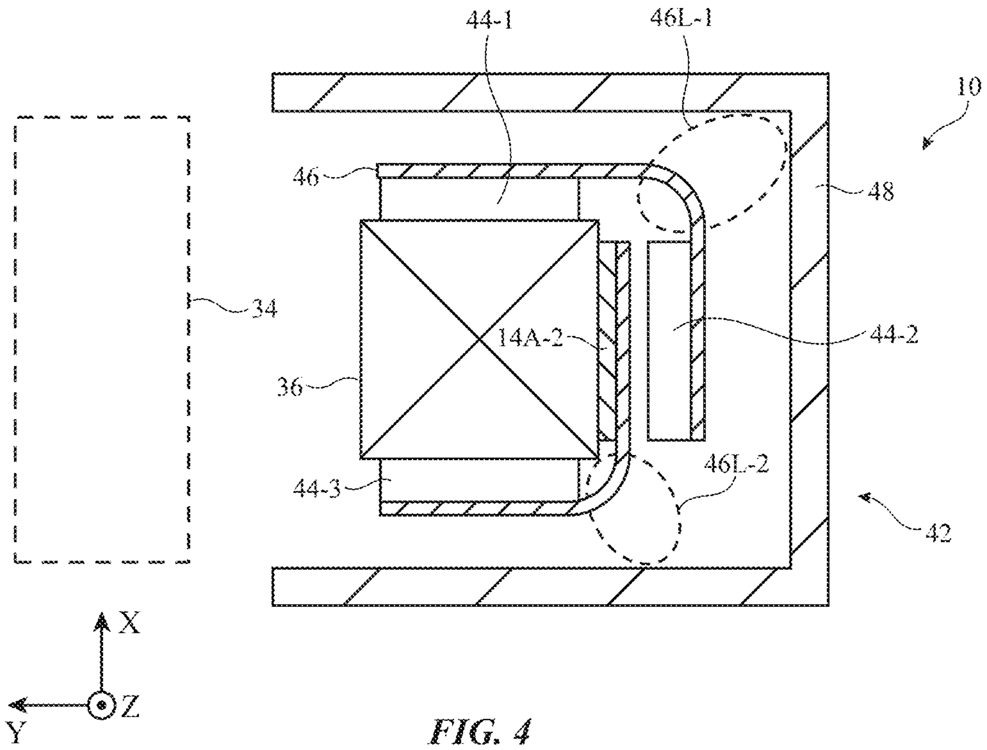
FIG. 4 is a side view of an illustrative light projector module with display modules and system-in-packages mounted on a common flexible printed circuit in accordance with some embodiments.

There are multiple ways to integrate the display modules and the system-in-packages into the projector. One option is to mount each one of the display modules and the system-in-packages on a common flexible printed circuit with multiple bends. FIG. 4 is a side view of an electronic device with a projector that includes a flexible printed circuit of this type.

As shown in FIG. 4, SiP 44-1, SiP 44-2, SiP 44-3, and display module 14A-2 are all mounted on common flexible printed circuit 46. Although not explicitly shown in FIG. 4 for simplicity of the drawing, display modules 14A-1 and 14A-2 may also be mounted to the common flexible printed circuit 46. Flexible printed circuit 46 has multiple bends between the portions upon which rigid structures such as the system-in-packages and display modules are mounted.

To allow the integration of flexible printed circuit 46 into light projector module 42 and sufficient tolerance for the position of flexible printed circuit 46, the light projector module 42 may accommodate one or more tolerance loops 46L associated with flexible printed circuit. FIG. 4 shows a first tolerance loop 46L-1 at a first bend in flexible printed circuit 46 and a second tolerance loop 46L-2 at a second bend in flexible printed circuit 46. The tolerance loops need to be unoccupied by other system components to allow a tolerance in position for flexible printed circuit 46.

FIG. 4 shows how light projector module 42 may include a housing 48. Housing 48 may be formed from a rigid material such as plastic or metal that surrounds and encloses optical combiner 36, flexible printed circuit 46, display modules 14A, and system-in-packages 44. As shown in FIG. 4, housing 48 may have an opening on one side that allows light from optical combiner 36 to be provided to collimating optics 34. Housing 48 may cover the remaining five sides of optical combiner 36.

As shown in FIG. 4, the size and dimensions of housing 48 may be selected to accommodate service loops 46L associated with flexible printed circuit. The resulting light projector module has unoccupied volume within the housing that is associated with service loops 46L. It may be desirable for light projector module 42 to have as compact an arrangement as possible to mitigate the volume requirements within electronic device 10. Because electronic device 10 is configured to be worn on a user's head, mitigating the size of light projector module 42 as much as possible may be particularly important to improving the user experience. To make light projector module 42 more compact, flexible printed circuit 46 may be omitted from the module and the internal components may instead be directly bonded to one another. As an example, the internal components may be directly bonded to one another at ninety degree angles.

Figure 5:
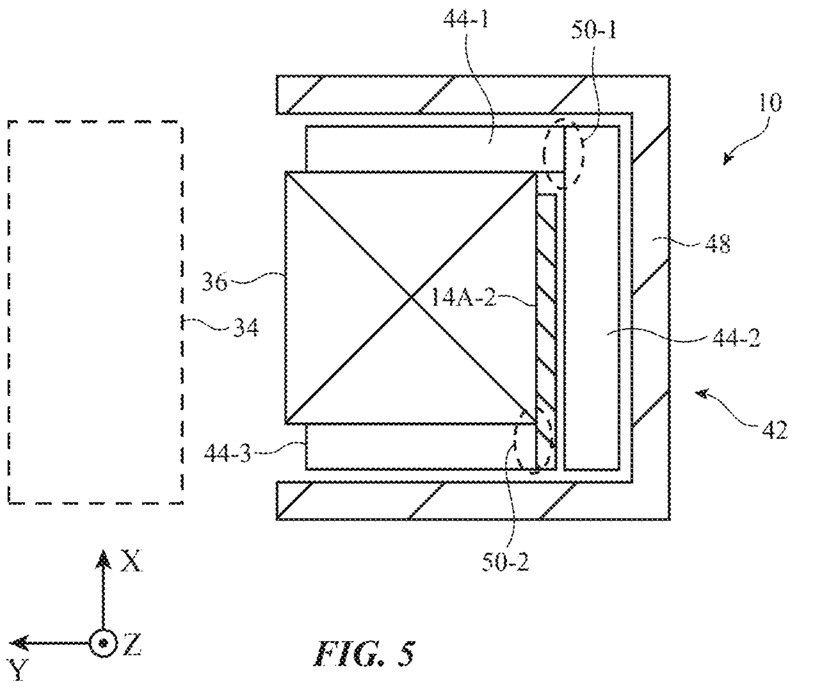
FIG. 5 is a side view of an illustrative light projector module with components directly bonded at ninety degree angles in accordance with some embodiments.

FIG. 5 is a side view of an illustrative light projector module with rigid components that are directly bonded to one another at ninety degree angles. As shown, SiP 44-1 may have a direct bond 50-1 to SiP 44-2 such that system-in-packages 44-1 and 44-2 are bonded at a ninety degree angle relative to one another. Direct bond 50-1 may secure system-in-packages 44-1 and 44-2 to one another mechanically as well as connect system-in-packages 44-1 and 44-2 electrically to allow signals to be communicated between system-in-packages 44-1 and 44-2. Direct bond 50-1 may therefore be referred to as a mechanical and electrical connection between system-in-packages 44-1 and 44-2.

FIG. 5 shows a second direct bond 50-2 between SiP 44-3 and display module 14A-2. As shown, SiP 44-3 and display module 14A-2 are bonded at a ninety degree angle relative to one another. Direct bond 50-2 may secure SiP 44-3 to display module 14A-2 as well as connect SiP 44-3 and display module 14A-2 electrically to allow signals to be communicated between SiP 44-3 and display module 14A-2. Direct bond 50-2 may therefore be referred to as a mechanical and electrical connection between SiP 44-3 and display module 14A-2.

Light projector module 42 may therefore include one or more direct bonds between components. These direct bonds may allow for the flexible printed circuit of FIG. 4 (and the corresponding tolerance loops) to be omitted. Omitting the flexible printed circuit in favor of directly bonded components may reduce the size of housing 48 and light projector module 42 on the whole.

Figure 6:
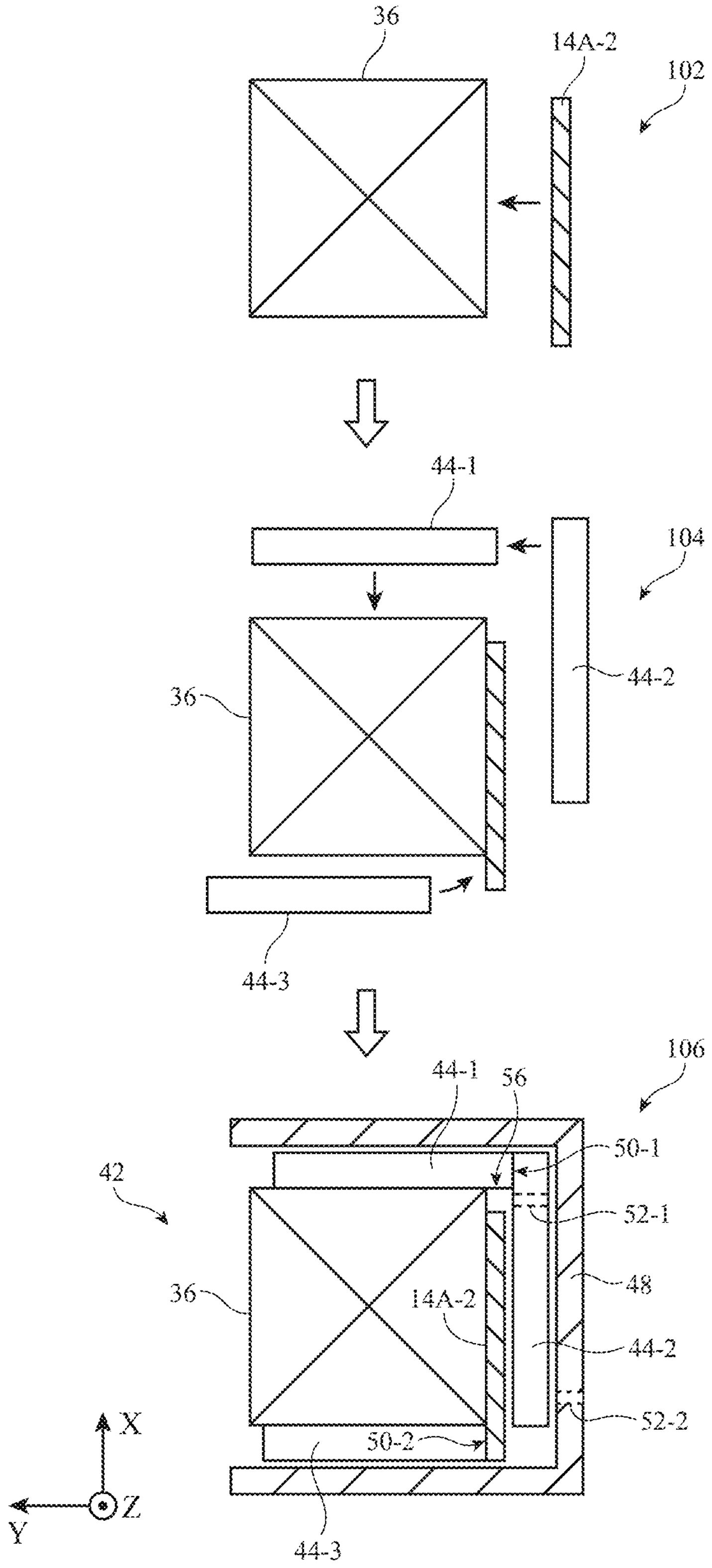
FIG. 6 is a flowchart showing an illustrative method of forming a light projector module with system-in-packages directly bonded at ninety degree angles in accordance with some embodiments.

FIG. 6 is a flowchart showing a method for forming a light projector module using one or more direct bonds between rigid components. At step 102, display module 14A-2 may be attached to a first side of optical combiner 36. The display module 14A-2 may be attached to the optical combiner using optically clear adhesive or any other desired techniques.

Next, at step 104, system-in-packages 44-1, 44-2, and 44-3 may be added to the light projector module. SiP 44-1 may be attached to a second side of optical combiner 36. SiP 44-1 may be attached to the optical combiner using optically clear adhesive or any other desired techniques. SiP 44-3 may be attached to a third side of optical combiner 36. SiP 44-3 may be attached to the optical combiner using optically clear adhesive or any other desired techniques.

SiP 44-2, meanwhile, is directly bonded to the right edge of SiP 44-1 such that system-in-packages 44-1 and 44-2 are at a ninety degree angle relative to one another (see direct bond 50-1). After system-in-packages 44-1 and 44-2 are directly bonded to one another, display module 14A-2 is interposed between optical combiner 36 and SiP 44-2 on the first side of optical combiner 36.

Additionally, the right edge of SiP 44-3 may be directly bonded to display module 14A-2 such that system-in-package 44-3 is at a ninety degree angle relative to display module 14A-2 (see direct bond 50-2).

Finally, at step 106 housing 48 may be formed around optical combiner 36, display modules 14A, and system-in-packages 44. Housing 48 may be a rigid member that is attached to one or more of optical combiner 36, display modules 14A, and system-in-packages 44. In another possible arrangement, housing 48 may be formed using a low injection pressure overmold (LIPO) process.

It is noted that one or more of the rigid components in the light projector module may include a hole to allow for injection of a mold material to fill the interior volume of the light projector module. For example, FIG. 6 shows a first hole 52-1 in SiP 44-2 and a second hole 52-2 in housing 48. A mold material such as epoxy may be injected into the interior volume of the light projector module through holes 52-1 and/or 52-2. With this type of arrangement, mold material may fill the interior volume 56 between one or more of the rigid components within the light projector module (e.g., between display module 14A-2 and SiP 44-2).

FIG. 6 shows an example where direct bonds are formed between two system-in-packages (e.g., SiP 44-1 and SiP 44-2) and between a SiP and a display module (e.g., SiP 44-3 and display module 14A-2). In general, any desired components within the light projector module may be directly bonded. The components may be directly bonded such that the components are positioned at a ninety degree angle relative to one another or at another desired angle relative to one another.

Light projector module 42 may also optionally include one or more additional rigid components. The additional rigid components may be used to form direct bonds within the light projector module. The rigid components may comprise rigid printed circuit boards or other desired rigid electronic components.

Figure 7:
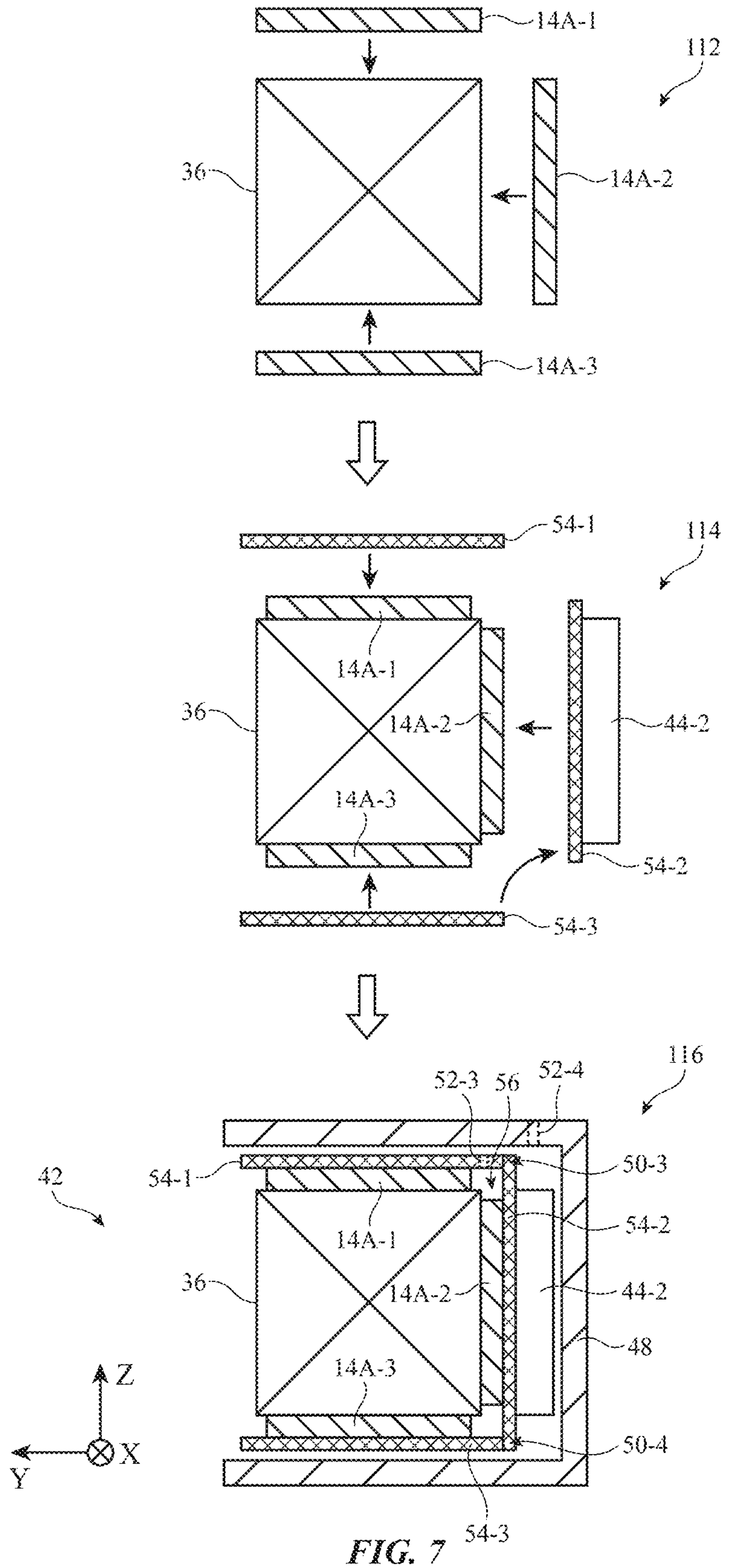
FIG. 7 is a flowchart showing an illustrative method of forming a light projector module with substrates directly bonded at ninety degree angles in accordance with some embodiments.

FIG. 7 is a flowchart showing a method for forming a light projector module using one or more direct bonds and one or more additional substrates. At step 112, display module 14A-1 may be attached to a first side of optical combiner 36, display module 14A-2 may be attached to a second side of optical combiner 36, and display module 14A-3 may be attached to a third side of optical combiner 36. The display modules may be attached to the optical combiner using optically clear adhesive or any other desired techniques.

At step 114, substrate 54-1 may be attached to display module 14A-1, substrate 54-2 may be attached to display module 14A-2, and substrate 54-3 may be attached to display module 14A-3. The substrates 54 may be rigid components (e.g., rigid printed circuit boards) and may be attached to the display modules using optically clear adhesive or any other desired techniques. As another example, each substrate may be attached to a respective display module using surface mount technology (SMT) (e.g., substrate 54-1 may be soldered to display module 14A-1, substrate 54-2 may be soldered to display module 14A-2, and substrate 54-3 may be soldered to display module 14A-3).

As shown in FIG. 7, substrate 54-2 may be attached to SiP 44-2 before being attached to display module 14A-2. Substrate 54-2 may be soldered to SiP 44-2 using surface mount technology. In addition to being attached to display module 14A-1, substrate 54-1 may be directly bonded to substrate 54-2 such that substrates 54-1 and 54-2 are at a ninety degree angle (see direct bond 50-3). In addition to being attached to display module 14A-3, substrate 54-3 may be directly bonded to substrate 54-2 such that substrates 54-3 and 54-2 are at a ninety degree angle (see direct bond 50-4). Substrate 54-2 therefore has two direct bonds: one to substrate 54-1 and one to substrate 54-3.

Finally, at step 116 housing 48 may be formed around optical combiner 36, display modules 14A, and system-in-packages 44. Housing 48 may be a rigid member that is attached to one or more of optical combiner 36, display modules 14A, and system-in-packages 44. In another possible arrangement, housing 48 may be formed using a low injection pressure overmold (LIPO) process.

It is noted that one or more of the rigid components in the light projector module may include a hole to allow for injection of a mold material to fill the interior volume of the light projector module. For example, FIG. 7 shows a first hole 52-3 in substrate 52-3 and a second hole 52-4 in housing 48. A mold material such as epoxy may be injected into the interior volume of the light projector module through holes 52-3 and/or 52-4. With this type of arrangement, mold material may fill the interior volume 56 between one or more of the rigid components within the light projector module (e.g., in the gap between display modules 14A-1 and 14A-2).

In addition to saving space within the electronic device (relative to using a flexible printed circuit as in FIG. 4), the techniques of both FIGS. 6 and 7 may have the advantage of directly aligning components within the light projector module, improving alignment within the light projector module (relative to using a flexible printed circuit as in FIG. 4).

There are numerous ways to form direct bonds 50 in light projector module 42. FIGS. 8A-8F show examples of direct bonds in a light projector module. The direct bonds of FIGS. 8A-8F may be used to bond any two desired components within the light projector module. FIGS. 8A-8F show a specific example where a system-in-package 44 is directly bonded to a display module 14A. However, the direct bonds of FIGS. 8A-8F may be between any two of a display module 14A (e.g., a rigid substrate in a display module), a system-in-package 44 (e.g., a rigid substrate in a system-in-package), a substrate 54, a rigid printed circuit board, a flexible printed circuit, and/or any other desired electronic component.

Figure 8A:
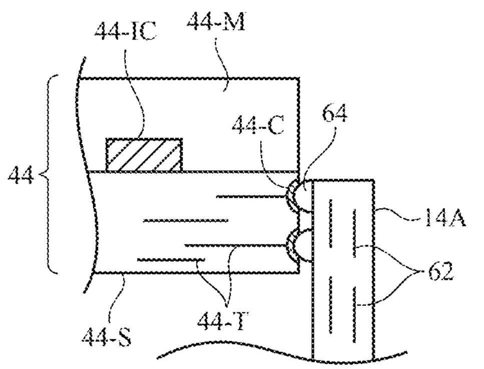
FIG. 8A is a side view of an illustrative direct bond between a system-in-package and a display module where the system-in-package has a substrate with a castellated edge surface that is bonded to the display module in accordance with some embodiments.
Figure 8B:
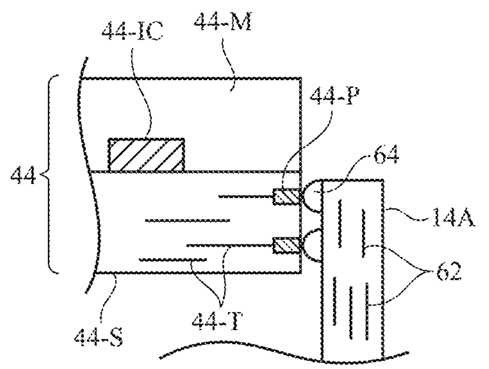
FIG. 8B is a side view of an illustrative direct bond between a system-in-package and a display module where the system-in-package has a substrate with a planar edge surface that is bonded to the display module in accordance with some embodiments.

As shown in FIGS. 8A and 8B, system-in-package 44 may include a substrate 44-S with one or more traces 44-T. There may be multiple layers of traces with conductive vias selectively connecting traces on different layers. One or more integrated circuits 44-IC and/or other electronic components may be mounted on an upper surface of substrate 44-S. Additionally, a mold material 44-M may be formed over the electronic components on substrate 44-S. The mold material may conform to the underlying electronic components and provides a smooth upper surface for the SiP. FIG. 8A further shows how display module 14A may include traces 62 in a rigid substrate.

FIGS. 8A and 8B both show a first type of direct bond where display module 14A is attached directly to an edge surface of substrate 44-S in SiP 44. As shown in FIG. 8A, there may be contacts 44-C at the edge surface of substrate 44-S. In FIG. 8A, contacts 44-C are formed in recessed portions of the edge surface. Due to the recesses in the side surface, the side surface of substrate 44-S may sometimes be referred to as castellated and contacts 44-C may sometimes be referred to as castellated contacts. Contacts 64 on display module 14A (sometimes referred to as bumps 64) may be mechanically and electrically connected to contacts 44-C on the edge surface of substrate 44-S to form the direct bond between SiP 44 and display module 14A.

The example in FIG. 8A of contacts 44-C being formed in recesses in the edge of substrate 44-S is merely illustrative. In another possible arrangement, shown in FIG. 8B, substrate 44-S has contact pads 44-P at the edge surface such that the edge surface 44-S is smooth (e.g., without recessed portions as in FIG. 8A). Contacts 64 on display module 14A may be mechanically and electrically connected to pads 44-P on the edge surface of substrate 44-S to form the direct bond between SiP 44 and display module 14A.

FIGS. 8A and 8B therefore show a first option where display module 14A is directly bonded to substrate 44-S in SiP 44. The example in FIGS. 8A and 8B of the SiP substrate contacts being on an edge surface are merely illustrative. The SiP substrate contacts used for direct bonding may alternatively be formed on an upper surface or a lower surface of substrate 44-S. Similarly, the example in FIGS. 8A and 8B of display module bumps being on a lower surface is merely illustrative. The display module bumps used for direct bonding may alternatively be formed on an upper surface or an edge surface of display module 14A.

Figure 8C:
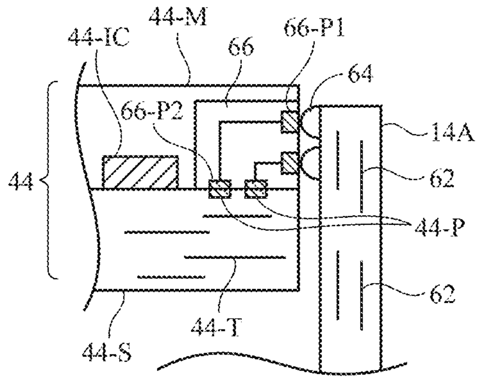
FIG. 8C is a side view of an illustrative direct bond between a system-in-package and a display module where the system-in-package has an interposer that is bonded to the display module in accordance with some embodiments.
Figure 8D:
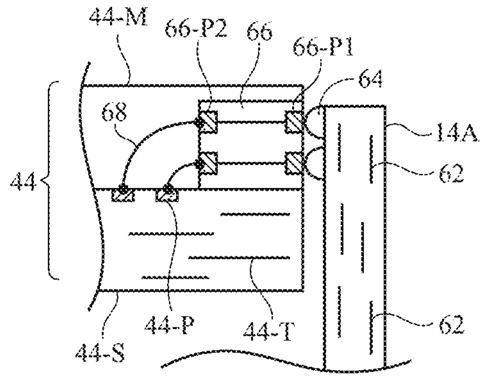
FIG. 8D is a side view of an illustrative direct bond between a system-in-package and a display module where the system-in-package has an interposer that is bonded to the display module and that is wire bonded to an upper surface of a substrate of the system-in-package in accordance with some embodiments.

FIGS. 8C and 8D show a second type of direct bond where display module 14A is attached to an interposer that is mounted on substrate 44-S in SiP 44. As shown in FIG. 8C, interposer 66 may be mounted on an upper surface of substrate 44-S (e.g., adjacent to one or more integrated circuits 44-IC). Mold 44-M may cover and conform to interposer 66. Interposer 66 may have one or more conductive contacts 66-P1 that are configured to mechanically and electrically connect to bumps 64 of display module 14A. Interposer 66 may have one or more conductive contacts 66-P2 that are configured to mechanically and electrically connect to conductive contacts 44-P of substrate 44-S. In this way, interposer 66 electrically connects bumps 64 on display module 14A to contacts 44-P on substrate 44-S via contacts 66-P1, 66-P2, and conductive traces between contacts 66-P1 and 66-P2.

In FIG. 8C, interposer 66 has first contacts 66-P1 on an edge surface of the interposer (e.g., a surface parallel to the edge surface of substrate 44-S) and second contacts 66-P2 on a lower surface of the interposer (e.g., a surface parallel the upper surface of substrate 44-S). With this arrangement, interposer may be soldered (or otherwise attached) directly to the upper surface of substrate 44-S.

In another possible arrangement, shown in FIG. 8D, interposer 66 has first contacts 66-P1 on a first edge surface of the interposer (e.g., a surface parallel to the edge surface of substrate 44-S) and second contacts 66-P2 on a second, opposing surface of the interposer (e.g., another surface parallel the edge surface of substrate 44-S). With this arrangement, there may be wire bonds 68 between contacts 66-P2 on interposer 66 and contacts 44-P on substrate 44-S. The wire bonds may be encapsulated by mold 44-M (that also encapsulates integrated circuits on the upper surface of 44-S).

It is noted that, in the examples of FIGS. 8C and 8D, interposer contacts 66-P1 have a similar structure to the contacts 44-P in FIG. 8B. However, the interposer contacts 66-P1 may instead have a similar structure to the contacts 44-C in FIG. 8A. In other words, the interposer may include recesses in the edge surface for contacts 66-P1 if desired.

In FIG. 8D, a redistribution layer may optionally be included on an upper surface of substrate 44-S between interposer 66 and the wire bond 68. In this arrangement, the wire bonds 68 are formed between the redistribution layer and contacts 44-P on substrate 44-S.

Figure 8E:
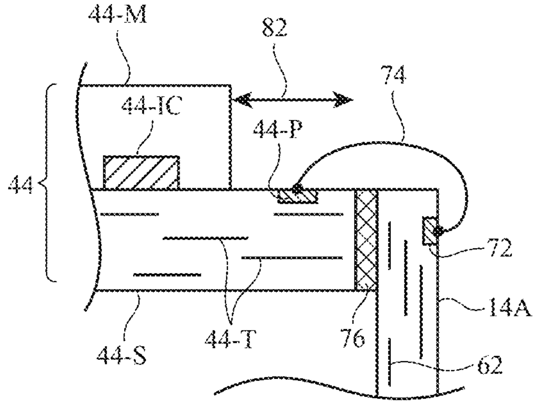
FIG. 8E is a side view of an illustrative direct bond between a system-in-package and a display module where the system-in-package has a wire bond to the display module in accordance with some embodiments.

FIG. 8E shows another option for the direct bond where display module 14A is wire bonded to substrate 44-S of SiP 44. As shown in FIG. 8E, the edge of mold material 44-M may be inboard from the edge of substrate 44-S by a distance 82 such that a portion of the upper surface of substrate 44-S is exposed and not covered by the mold material 44-M. In particular, a conductive contact pad 44-P may be exposed on the upper surface of substrate 44-S. There may be a wire bond 74 between conductive contact pad 44-P and a contact pad 72 on display module 14A. Wire bond 74 therefore electrically connects SiP and display module 14A.

An adhesive layer 76 is used to mechanically connect SiP 44 and display module 14A. The adhesive layer may be a pressure sensitive adhesive (PSA) layer or any other desired type of adhesive layer. In FIG. 8E, adhesive layer 76 attaches the edge surface of substrate 44-S to a lower surface of display module 14A. This example is merely illustrative. In general, the adhesive layer may be positioned between any two desired surfaces of SiP 44 and display module 14A. Additionally, the positions of the contact pads for the wire bond in FIG. 8E are merely illustrative. In general, the contact pads for the wire bond may be on any desired surfaces of SiP 44 and display module 14A.

Figure 8F:
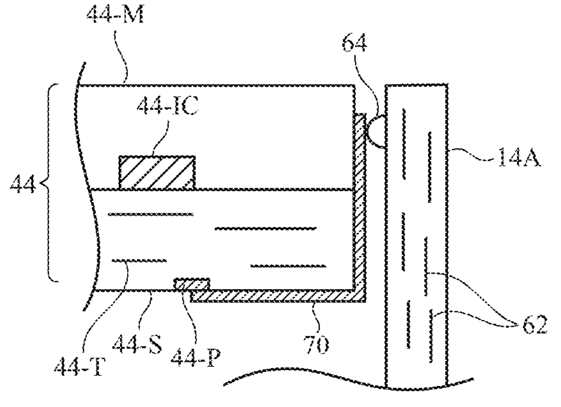
FIG. 8F is a side view of an illustrative direct bond between a system-in-package and a display module where the system-in-package has a printed contact that is bonded to the display module in accordance with some embodiments.

In another possible arrangement, shown in FIG. 8F, a silver ink may be printed on SiP 44 to form contact 70. Contact 70 may be electrically connected to both contact pad 44-P in substrate 44-S and bump 64 of display module 14A. Contact 70 may be printed on any desired portion of SiP 44 (e.g., on the lower surface of substrate 44-S, on the edge surface of substrate 44-S, and on the edge surface of mold material 44-M as shown in FIG. 8F). In FIG. 8F, display module 14A is attached to printed contact 70 at an edge surface of SiP 44 but display module 14A may instead be attached to printed contact 70 at any other desired portion of SiP 44.

FIGS. 8A-8F show various conductive components such as recessed contacts 44-C, bumps 64, contact pads 44-P, contacts 66-P1, contacts 66-P2, wire bonds 68, contacts 72, and printed contact 70. In general, all of these components may generally be referred to as conductive components, conductive contacts, conductive interconnect components, etc.

In general, any of the electrically connected contacts herein may be bonded using laser assisted bonding (LAB), reflow, solder jetting, an anisotropic conductive film (ACF), wire bonding, a conductive epoxy, etc.

Figure 9B:
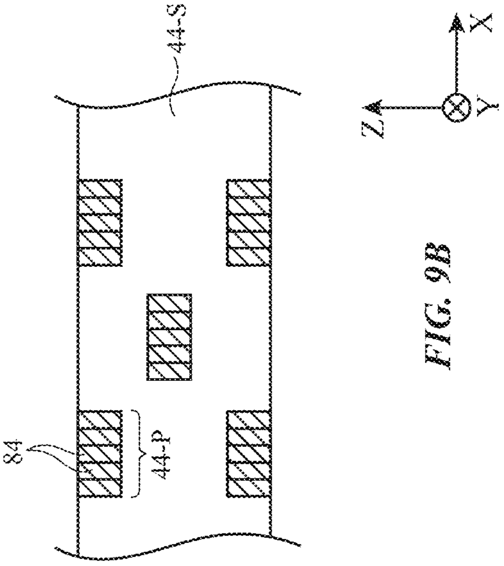
FIG. 9B is a side view of an illustrative system-in-package substrate with groups of vias that define conductive contacts in accordance with some embodiments.
Figure 9A:
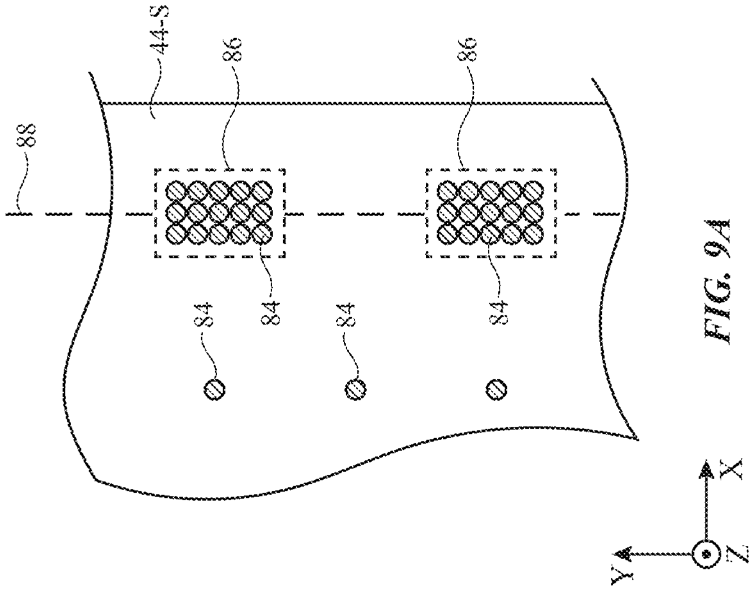
FIG. 9A is a top view of an illustrative system-in-package substrate with groups of vias that define conductive contacts in accordance with some embodiments.

FIGS. 9A and 9B show how multiple conductive vias and cutting may be used to create exposed conductive contacts on the edge of a substrate. FIG. 9A is a top view of substrate 44-S. As shown in FIG. 9A, substrate 44-S may include a plurality of conductive vias 84. Some of the conductive vias (e.g., the three conductive vias on the left) may be used to connect conductive traces at different planes within the substrate. Additionally, there may be groups 86 of conductive vias 84 that are used to form conductive contacts 44-P for the edge of substrate 44-S.

As shown in FIG. 9A, one or more via groups 86 may be formed within substrate 44-S. Substrate 44-S may be cut along a scribe line 88 that runs through the groups of vias. The edge of the substrate after the cutting operation is performed is shown in FIG. 9B. As shown in FIG. 9B, the groups of conductive vias 84 are exposed at the edge of substrate 44-S, defining edge contacts 44-P. The edge contacts may be formed at multiple planes within substrate 44-C (e.g., there are three planes of contacts in FIG. 9B). The example of using multiple conductive vias to define the edge contacts is merely illustrative. In general, one or more conductive vias may be used to define a contact for the substrate.

Figure 10A:
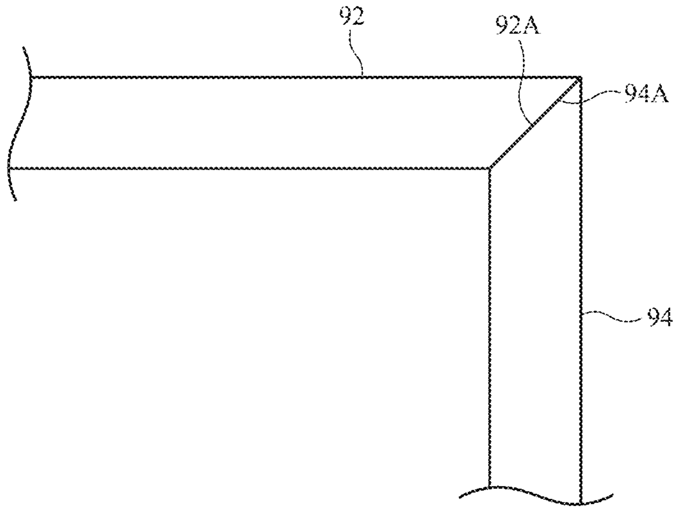
FIG. 10A is a side view of an illustrative direct bond between first and second rigid components having non-orthogonal edge surfaces in accordance with some embodiments.

FIG. 10A shows an example where two components are directly bonded such that the rigid components are at a ninety degree angle. In particular, component 92 is bonded to component 94. Each one of components 92 and 94 may be a display module 14A (e.g., a rigid substrate in a display module), a system-in-package 44 (e.g., a rigid substrate in a system-in-package), a substrate 54, a rigid printed circuit board, a flexible printed circuit, and/or any other desired electronic component.

In FIG. 10A, component 92 has an angled edge surface 92A that is at a non-orthogonal angle relative to the parallel upper and lower surfaces of the component. Component 94 has an angled edge surface 94A that is at a non-orthogonal angle relative to the parallel upper and lower surfaces of the component. The two non-orthogonal angles may be complementary (i.e., sum to ninety degrees) such that when surface 92A is directly bonded to surface 94A, the upper and lower surfaces of components 92 and 94 are orthogonal to one another (e.g., the lower surface of components 92 and 94 meet at a right angle and the upper surface of components 92 and 94 meet at a right angle).

Figure 10B:
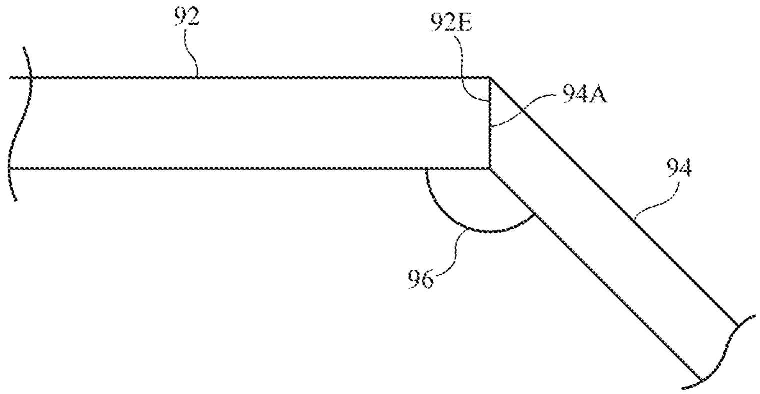
FIG. 10B is a side view of an illustrative direct bond between first and second rigid components at a non-parallel, non-orthogonal angle in accordance with some embodiments.

In another possible arrangement, the edge surfaces of one or more components may be designed to create a non-parallel, non-orthogonal angle between the components. In the example of FIG. 10B, component 92 has an edge surface 92E that is orthogonal to the upper and lower surfaces of component 92. In the example of FIG. 10B, component 94 has an angled edge surface 94A that is at a non-orthogonal angle relative to the upper and lower surfaces of component 94. Orthogonal edge surface 92E is directly bonded to non-orthogonal edge surface 94A such that components 92 and 94 are at a non-orthogonal angle 96 relative to one another. The magnitude of angle 96 may be greater than 90 degrees, between 91 degrees and 179 degrees, between 100 degrees and 170 degrees, between 120 degrees and 150 degrees, less than 90 degrees, between 1 degree and 89 degrees, between 10 degrees and 80 degrees, between 30 degrees and 60 degrees, etc.

In general, the angle between directly bonded components may be selected to fit a target volume of the light projector module.

Figure 11:
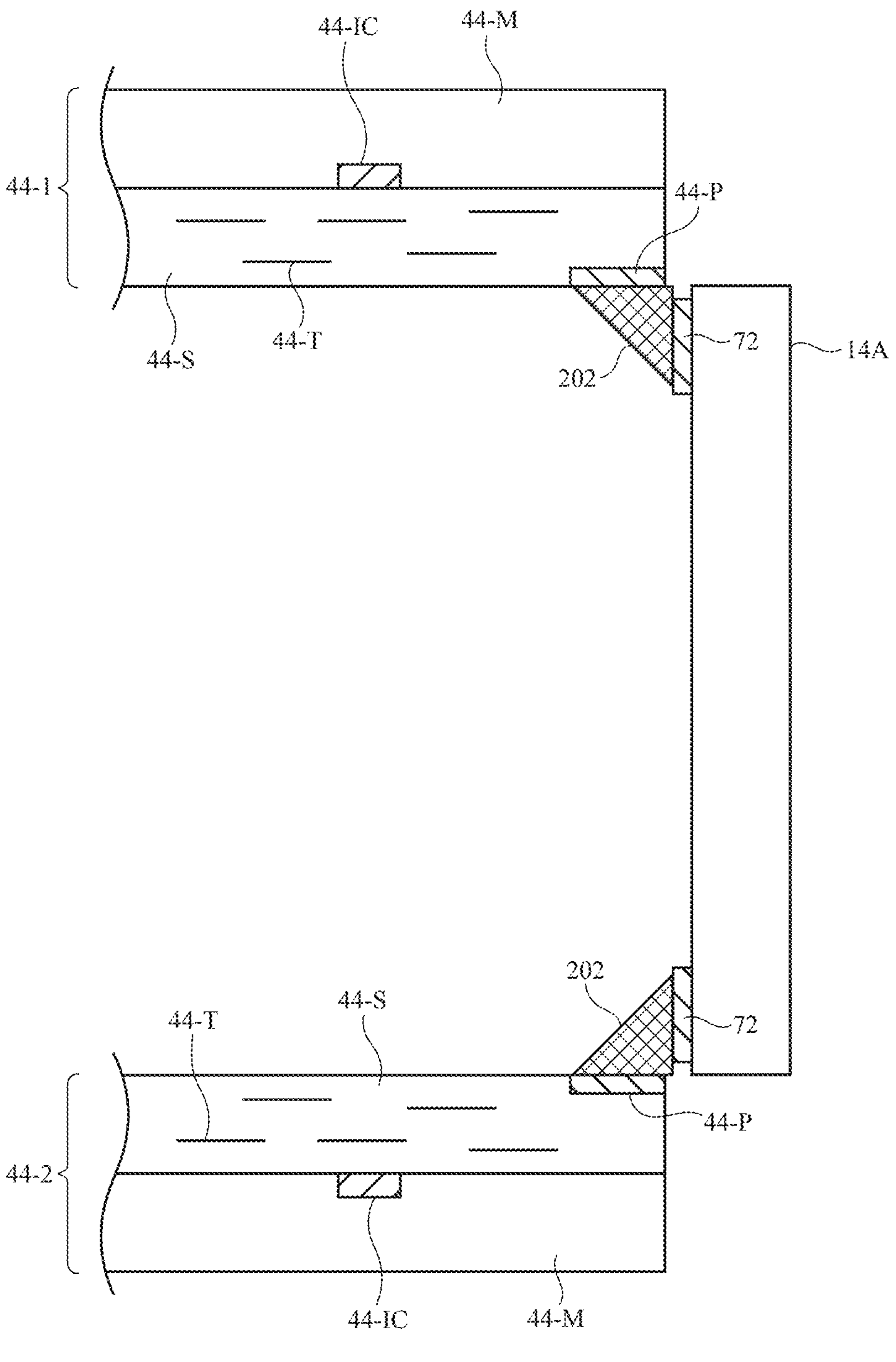
FIG. 11 is a side view of an illustrative direct bond between a system-in-package and a display module that includes a solder fillet connection in accordance with some embodiments.

FIG. 11 is a side view of a light projector module with direct bonds formed using solder. In the example of FIG. 11, display module 14A is directly bonded to a first SiP 44-1 and a second SiP 44-2. In particular, each substrate 44-S has a contact pad 44-P and display module 14A has contact pads 72. Each contact pad 44-P is electrically and mechanically connected to a respective contact pad 72 using a solder fillet connection. In other words, solder 202 electrically and mechanically connects the orthogonal contact pads.

Figure 12:
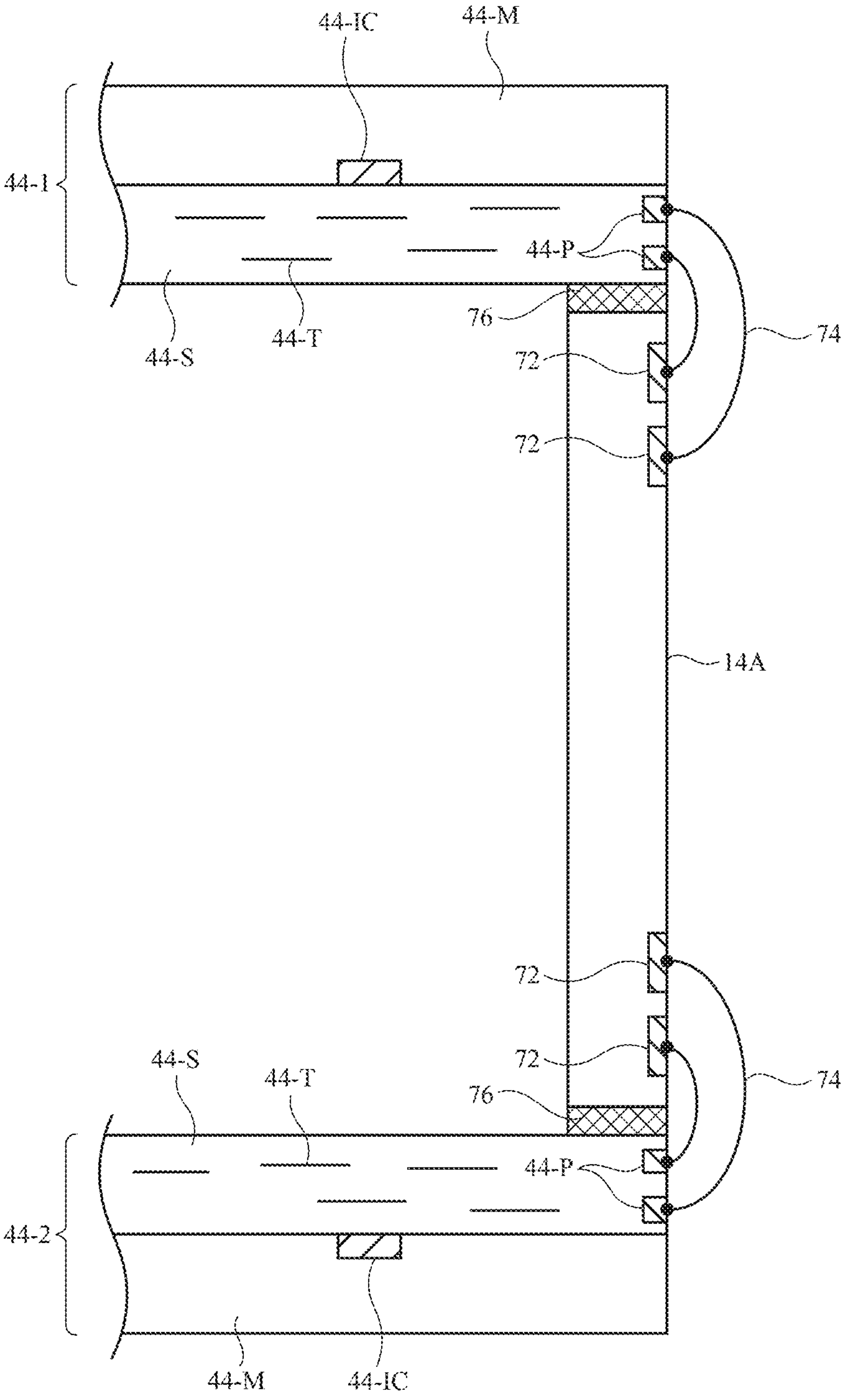
FIG. 12 is a side view of an illustrative direct bond between a system-in-package and a display module where the system-in-package has a wire bond to the display module in accordance with some embodiments.

FIG. 12 is a side view of a light projector module with direct bonds formed using wire bonds and adhesive. In the example of FIG. 12, display module 14A is directly bonded to a first SiP 44-1 and a second SiP 44-2. In particular, each substrate 44-S has edge contacts 44-P and display module 14A has contact pads 72. Each contact pad 44-P is electrically connected to a respective contact pad 72 using a wire bond 74.

As shown in FIG. 12, display module may be interposed between system-in-packages 44-1 and 44-2 such that a first edge surface of display module 14A is attached to SiP 44-1 (e.g., a lower surface of substrate 44-S of SiP 44-1) using a first adhesive layer 76 and a second edge surface of display module 14A is attached to SiP 44-2 (e.g., an upper surface of substrate 44-S of SiP 44-2) using a second adhesive layer 76.

Figure 13:
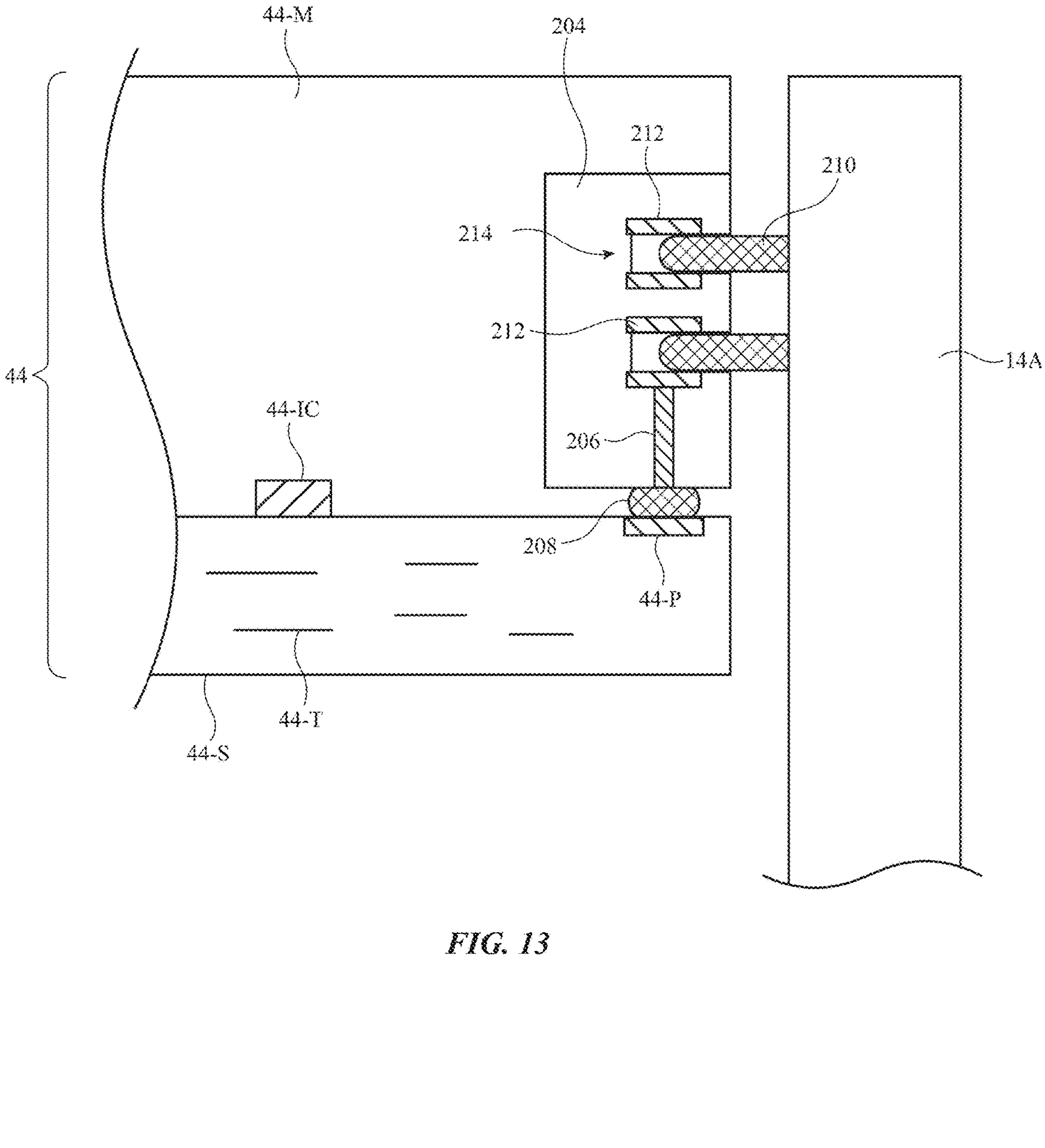
FIG. 13 is a side view of an illustrative direct bond between a system-in-package and a display module where the system-in-package has a printed circuit board with through-holes that receive conductive pins of the display module in accordance with some embodiments.

In yet another possible arrangement for a direct bond, shown in FIG. 13, display module 14A may include pins that are mechanically and electrically connected to through-holes in a printed circuit board mounted on SiP 44. As shown in FIG. 13, SiP 44 may include a contact pad 44-P on an upper surface of substrate 44-S that is mechanically and electrically connected to printed circuit board (PCB) 204. Printed circuit board 204 may include a bar via 206 that is mechanically and electrically connected to contact pad 44-P by conductive layer 208 (e.g., solder, anisotropic conductive film, etc.).

In addition to bar via 206 (sometimes referred to as conductive via 206), printed circuit board 204 may include one or more through-holes 214. Through-holes 214 may sometimes be referred to as microsockets. Each through-hole may extend partially through the printed circuit board or may extend entirely through the printed-circuit board. The through-holes may be plated with conductive contacts 212 using electroless nickel immersion gold (ENIG) or another desired material. Display module 14A may have conductive pins 210 that extend into through-holes 214 to mechanically and electrically connect SiP 44 and display module 14A. In particular, pins 210 may be electrically and mechanically connected to conductive contacts 212 by solder or another conductive material. Hot air solder leveling (HASL) may be used to connect contacts 212 and pins 210.

Printed circuit board 204 may optionally have a cover layer on one or more sides. Additionally, as shown in FIG. 13 mold material 44-M may cover printed circuit board 204 and/or may be interposed between PCB 204 and substrate 44-C (e.g., the mold material may conform to and laterally surround conductive layer 208).

To manufacture PCB 204, the PCB may be cut through bar via 206 to expose a portion of bar via 206 at the edge of the PCB. The edge of the PCB may then be attached to substrate 44-S as shown in FIG. 13

The foregoing is merely illustrative and various modifications can be made to the described embodiments. The foregoing embodiments may be implemented individually or in any combination.

What is claimed is:

1. A display system comprising:

a waveguide; and a light projector module that emits light into the waveguide, wherein the light projector module comprises:

an optical combiner having first and second sides;

a first rigid component on the first side of the optical combiner; and a second rigid component on the second side of the optical combiner, wherein the first and second rigid components are orthogonal and wherein the first rigid component is directly bonded to the second rigid component.

2. The display system defined in claim 1, wherein the first rigid component comprises a display module.

3. The display system defined in claim 2, wherein the second rigid component comprises an additional display module.

4. The display system defined in claim 2, wherein the second rigid component comprises a system-in-package.

5. The display system defined in claim 1, wherein the first rigid component comprises a system-in-package.

6. The display system defined in claim 5, wherein the second rigid component comprises a rigid substrate.

7. The display system defined in claim 5, wherein the second rigid component comprises an additional system-in-package.

8. The display system defined in claim 1, wherein the optical combiner has a third side opposite the first side, wherein the first rigid component is a first system-in-package, wherein the second rigid component is a second system-in-package, and wherein the light projector module further comprises:

a third system-in-package on the third side of the optical combiner.

9. The display system defined in claim 8, wherein the light projector module further comprises:

a display module that is interposed between the second system-in-package and the optical combiner, wherein the display module is orthogonal to the third system-in-package and wherein the display module is directly bonded to the third system-in-package.

10. The display system defined in claim 9, wherein the light projector module further comprises:

an epoxy filler that fills an interior volume between the display module and the second system-in-package.

11. The display system defined in claim 10, wherein the second system-in-package comprises a hole.

12. The display system defined in claim 1, wherein the first rigid component comprises first and second opposing surfaces connected by a first edge surface, wherein the second rigid component comprises third and fourth opposing surfaces connected by a second edge surface, wherein the first rigid component comprises a first conductive contact on the first edge surface, wherein the second rigid component comprises a second conductive contact on the third surface, and wherein the first conductive contact is mechanically and electrically connected to the second conductive contact.

13. The display system defined in claim 12, wherein the first conductive contact is formed in a recessed portion of the first edge surface.

14. The display system defined in claim 12, wherein the first conductive contact on the first edge surface is defined by a group of conductive vias.

15. The display system defined in claim 1, wherein the first rigid component comprises a system-in-package with a substrate and an interposer mounted on the substrate and wherein the interposer is directly bonded to the second rigid component.

16. The display system defined in claim 15, wherein the interposer has first and second opposing surfaces connected by an edge surface, wherein the edge surface of the interposer is directly bonded to the second rigid component, and wherein the second surface of the interposer is attached to an upper surface of the substrate.

17. The display system defined in claim 15, wherein the interposer has first and second opposing surfaces connected by first and second opposing edge surfaces, wherein the first edge surface of the interposer is directly bonded to the second rigid component, and wherein the second edge surface of the interposer is wire bonded to an upper surface of the substrate.

18. The display system defined in claim 1, wherein the light projector module comprises:

an adhesive layer that attaches the first and second rigid components; and a wire bond between the first and second rigid components.

19. The display system defined in claim 1, wherein solder mechanically and electrically connects the first rigid component to the second rigid component.

20. The display system defined in claim 1, wherein the first rigid component comprises a printed circuit board with through-holes and wherein the second rigid component comprises conductive pins that extend into the through-holes.

21. A display system comprising:

a waveguide; and a light projector module that emits light into the waveguide, wherein the light projector module comprises:

a display module;

a first system-in-package having a first substrate; and a second system-in-package having a second substrate, wherein the first and second substrates are orthogonal and wherein a direct bond mechanically and electrically connects the first and second substrates.

22. A display system comprising:

a waveguide; and a light projector module that emits light into the waveguide, wherein the light projector module comprises:

an optical combiner having first and second opposing sides, third and fourth opposing sides, and fifth and sixth opposing sides;

a first display module formed on the first side of the optical combiner;

a second display module formed on the second side of the optical combiner;

a third display module formed on the third side of the optical combiner, wherein light from the first, second and third display modules is configured to exit the fourth side of the optical combiner;

a first system-in-package formed on the fifth side of the optical combiner;

a second system-in-package formed on the sixth side of the optical combiner; and a third system-in-package formed on the third side of the optical combiner, wherein the third display module is interposed between the third side of the optical combiner and the third system-in-package, and wherein at least two components of the first display module, the second display module, the third display module, the first system-in-package, the second system-in-package, and the third system-in-package are directly bonded and orthogonal to one another.

* * * * *